Aug. 26, 1924.
O. DOMMER
1,506,617
METHOD OF AND APPARATUS FOR TESTING GAS MIXTURES
Original Filed Oct. 11, 1920
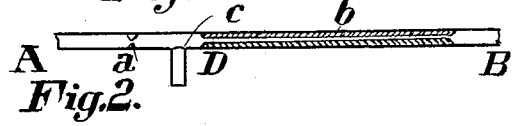
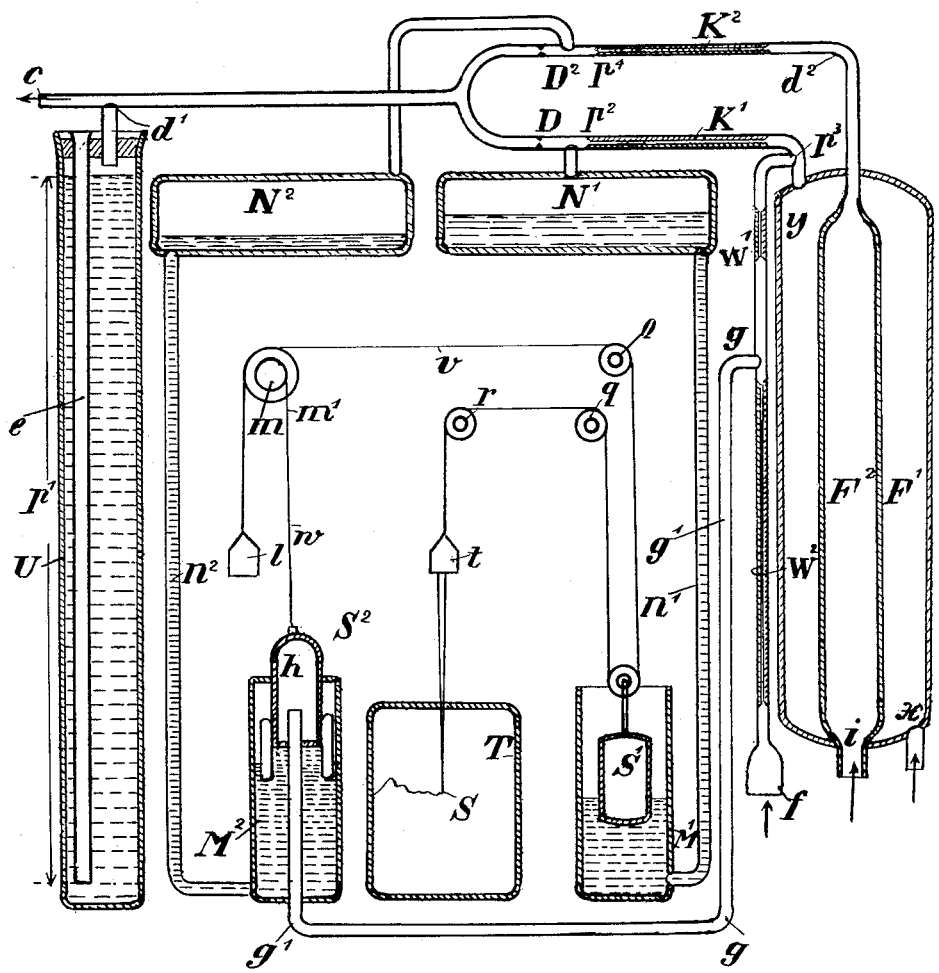
Inventor:
O. Dommer
By H. R. Kerslake
Atty.

Patented Aug. 26, 1924.

1,506,617

UNITED STATES PATENT OFFICE.

OTTO DOMMER, OF KARLSRUHE, GERMANY.

METHOD OF AND APPARATUS FOR TESTING GAS MIXTURES.

Application filed October 11, 1920, Serial No. 416,289. Renewed July 8, 1924.

*To all whom it may concern:*

Be it known that I, OTTO DOMMER, a citizen of the German Republic, residing at Karlsruhe, Baden, whose post-office address is 16 Weltzienstrasse, Karlsruhe, Baden, Germany, have invented certain new and useful Improvements in the Methods of and Apparatus for Testing Gas Mixtures, of which the following is a specification.

My invention relates to improvements in the method of and apparatus for testing gas mixtures, and the object of the improvements is to provide a method and an apparatus in which absorption liquids for ascertaining the components of the gas are dispensed with. With this object in view my invention consists in testing the gas by means of two properties thereof, viz, its viscosity and its specific gravity, for which purpose the gas is caused to flow through a conduit comprising in succession a portion responding to differences of the viscosity of the gas such as a capillary tube and a portion responding to differences in the specific gravity of the gas such as a nozzle, and the differential pressure between the capillary tube and the nozzle is measured. In order that my invention be more clearly understood an example embodying the same will be described hereinafter reference being had to the accompanying drawing and to the letters of reference marked thereon. In said drawing, Fig. 1 is a diagrammatical view illustrating the principle of my improved method, and Fig. 2 is a diagrammatical view illustrating my improved apparatus.

Before describing my improved methed in detail I shall at first explain the principle on which the method is based. Referring to Fig. 1, if a gas is made to flow in succession through a system consisting of a capillary tube $b$ and a nozzle $a$, between the said elements a differential pressure C is obtained which is a function of the resistances $a$ and $b$ and which may be expressed by the following formula:

$$C = f(a, b)$$

If the composition of the gas is changed other conditions being unchanged, for example, if air flowing through the system is mixed more or less with carbonic acid, the resistance of the gas flowing through the capillary tube $b$ and the nozzle $a$ varies accordingly, the resistance of the capillary tube being changed as a function of the viscosity and that of the nozzle as a function of the density or specific gravity. Therefore the differential pressure C is changed by $$dC = df(a, b).$$

The change in pressure $C+dC$ can be ascertained by means of a manometer connected to a branch pipe D, or it is continuously recorded.

In Fig. 2 I have shown in a diagrammatical way a preferred construction of the apparatus used for carrying out the method. The apparatus comprises a coarse filter (not shown), a fine filter $F_1$ having an inlet $x$ and an outlet $y$ for the gas to be tested, a conduit including in series a capillary tube $K_1$ and a nozzle $D_1$, a vacuum pump or the like connected at $c$ (not shown), and a vacuum apparatus for maintaining a constant vacuum at the discharge side of the nozzle $D_1$. As shown the said vacuum apparatus consists of an upright receptacle U closed at its top and connected with the pipe $d$ at $d_1$, and a vertical tube $e$ open at its top and passing into the receptacle U to a point near the bottom thereof. The receptacle is filled with a suitable liquid such as water, and it maintains a constant vacuum $p_1$ within the pipe $d$ which corresponds to the height of the column of liquid from the lower end of the pipe $e$ to the surface of the water within the receptacle U as is indicated by the line $p_1$. To a part intermediate the nozzle $D_1$ and the capillary tube $K_1$ a manometer is connected which as shown consists of a closed vessel $N_1$, an open receptacle $M_1$ connected with the vessel $N_1$ by a pipe $n_1$, a float $S_1$ disposed within the receptacle $M_1$, and a recording device consisting of a stylus S connected with the float $S_1$ in the manner to be described hereinafter. Within the vessel N, the pipe $n_1$, and the receptacle there is a column of a suitable liquid, ordinarily water.

The operation of the apparatus so far described is as follows: The gas to be tested is admitted through the inlet $x$, and the vacuum pump connected to the pipe $d$ at $c$ is set in operation. The gas flows through the filters and is cleaned therein. There-after it flows successively through the capillary tube $K_1$ and the nozzle $D_1$, where its pressure is successively reduced. The differential pressure of the gas between the capillary tube $K_1$ and the nozzle is recorded by means of the manometer $N_1$, $M_1$ and the stylus S on a rotary drum T shown conventionally on the drawing with a portion of the record produced by said stylus.

In the method and apparatus so far described the temperature and the pressure of the gas and the working pressure are assumed to be constant, which condition, however, prevails only in exceptional cases. For example, in case of flue gases being tested the chimney draught and the pressure of the gas vary continuously. In addition the resistance of the purifying filter or filters is different. If the difference of the pressures at the inlet to the system and at the inlet to the capillary tube $K_1$ is $p_3$, the differential of the pressure is $dp_3$, so that the total differential pressure between the capillary tube and the nozzle is $p_2 + dp_3$. Therefore compensating means must be provided in order to correct the indication of the stylus S. In the example shown in the figure such compensating means consist of a pipe $g$ connected to the inlet end of the capillary tube $K_1$ and open to the atmosphere at $f$, which pipe includes two resistances preferably in the form of capillary tubes $W_1$ and $W_2$ and is connected between the said tubes by a pipe $g_1$ with a compensating manometer to be described hereinafter.

The measurement based on the capillary tube $K_1$ and the nozzle $D_1$ is greatly influenced by the temperature, because the temperature coefficient for the viscosity is different from that for the density. This influence is compensated by means of a compensating gas such as air which is made to flow through a system similar to that provided by the capillary tube $K_1$ and the nozzle $D_1$ and controlling a compensating manometer cooperating with the manometer $N_1$, $M_1$. It will be understood that the temperature of the compensating gas must be the same as that of the gas to be tested.

The system for compensating the temperature is constructed as follows: Within the filter $F_1$ a filter $F_2$ is located which has an inlet $i$ for the compensating gas and which has the function to clean the compensating gas and to bring its temperature to that of the gas being tested. The filter $F_2$ is connected with a pipe $d_2$ comprising a capillary tube $K_2$ and a nozzle $D_2$ and connected behind the nozzle with the pipe $d$, the exhaust pump and the vacuum apparatus U. At a point intermediate the capillary tube $K_2$ and the nozzle $D_2$ the pipe $d_2$ is connected with the compensating manometer referred to above and comprising an upper closed vessel $N_2$ and a lower open receptacle $M_2$ connected by a pipe $n_2$. Within the vessel $N_2$ and receptacle $M_2$ there is a suitable liquid such as water, and within the receptacle $M_2$ there is a float $S_2$. The said float comprises a chamber $h$ which is closed at its top and open at its bottom, and into the said chamber there extends the aforementioned pipe $g_1$. The floats $S_1$ and $S_2$ are connected with the stylus S by means of chains or ropes $v$ and $w$ trained on rollers $m$, $m'$, $o$, $p$, $q$ and $r$, the float $S_1$ being suspended from the rope V and the roller $p$, and the float $S_2$ being suspended from the roller $m$ by means of the rope $w$. The rope $v$ which is trained on the larger roller $m_1$, rollers $o$, $q$, and $r$ carries at its ends weights $l$ and $t$ and the stylus S, which weights are balanced by the float $S_1$. The rollers $m$ and $m_1$ are rigidly connected with each other, and their diameter are at the ratio of 2:1.

The cooperation of the manometers will now be understood. The composition of the gas is recorded by means of the manometer $N_1$, $M_1$, the float $S_1$ setting the stylus S on the drum T. If now the temperature of the gas is changed, the pressure between the capillary tube $K_1$ and the nozzle $D_1$ is changed, so that the float $S_1$ is displaced, which displacement is compensated by means of the capillary tube $K_2$ and the nozzle $D_2$ and the manometer $N_2$, $M_2$, $S_2$. For example, if the float $S_1$ is raised, the float $S_2$ is raised the same amount. The displacement of the weight $l$ and the rope $v$ is the double of that of the float $S_2$. But when pulling the rope $v$ with the weight $l$ a certain amount the roller $p$ and float $S_1$ are raised one half the amount. Therefore, the displacements of the floats $S_1$ and $S_2$ result only in a displacement of the ropes $v$ and $w$ and the weight $l$, while the position of the stylus S is not altered.

In a similar way a variation of the pressure of the gas is compensated. For example, if the pressure of the gas is increased, the float $S_1$ rises. However, at the same time the pressure of the air between the resistances $W_1$ and $W_2$ is increased, which pressure is transmitted to the chamber $h$. Therefore the float $S_2$ rises, and this displacement compensates the rise of the float $S_1$, in the same way as has been described before.

Preferably the weight $l$ is slightly heavier than the weight $t$. This excess of weight amounts to about one third of a grain more or less (twenty milligrams) which is sufficient to compensate the friction of the rope upon the rollers $m'$, $o$, $p$, $q$, and $r$. The rope or cord $w$ is attached to the smaller or inner roller $m$, preferably by means of a pin or the like, not shown on the drawing. Both the floats $S^1$ and $S^2$ are hollow, and they are so adjusted as to freely be afloat upon the surface of the liquid in the manometer or pressure gauge. Then a change occurs in the composition of the gas to be tested, it will affect the gauge or manometer system $N^1$, $M^1$ and the float $S^1$ through the system $K^1$, $D^1$. If this change in composition should result in the rise of the float $S^1$, only the stylus $t$ will descend, and the rollers $p$, $q$, $r$ are moved. The rollers $o$ and $m'$ will not be moved, because the float $S^2$ is retained in its position by the surface tension of the liquid inside and outside of the same which the small excess of weight at $l$ cannot overcome quick enough. Inasmuch as about one thousand milligrams or 15½ grains would be required to raise the float one millimeter (about 4 hundredths of an inch) at an immersed sectional area of about ten square centimeters (about 1½ sq. inch) it is obvious that the rise and fall of the weight $S^1$ will result in the corresponding opposite movement of the indicating stylus S, while the weight $S^2$ is ordinarily prevented from immediately following the movement of the float $S^1$. On the other hand, if the temperature of the gas and of the air admitted for compensating purposes are changed in consequence of a change in the temperature of the room, these variations will affect simultaneously both the system $K^1$, $D^1$, as well as the system $K^2$, $D^2$, and the pressure gauges or manometers $N^1$ $M^1$, and $N^2$ $M^2$ will accordingly be correspondingly affected in the same manner, and the floats $S^1$ and $S^2$ are raised or lowered both the same amount. If for instance, the temperature is increased, the float $S^1$ will be raised. The indicating stylus $ts$ is, however, unable to descend on account of the upward movement of the float $S^2$ which causes a translation of the movement of the roller $p$ by means of the rollers $o$, $m$, and $m'$ instead of by way of the rollers $q$ and $r$, so that changes of temperature will not affect the position of the indicating stylus. The compensation of the pressure $p^3$ acting upon the gas to be tested, takes place in a similar manner. A lowering of the pressure, for instance, will result in a corresponding descent of the float $S^1$; at the same time, however, and for the same amount as in the system $K^1$ $D^1$ the pressure of the compensating air between the resistances $W^1$ and W will be reduced, causing a corresponding movement of the hollow body $h$, the size and area of which are so adjusted as to cause the float $S^2$ to descend for the same value as the float $S^1$, so that the compensation or correction for the influence of changes of pressure is effected in the same manner as indicated above with reference to the compensation for variations of temperature.

In the same way also such variations of the pressure are compensated which are caused by the vacuum pump connected at $c$ drawing different amounts of air through the vacuum apparatus U, which variations are in no case large. Generally speaking any movements of the floats $S^1$ and $S^2$, which take place in the same direction and simultaneously, are compensated. The working pressure $p^1$ can therefore vary within the limits which are determined by the manometer structure. The liquid column, therefore, need not be kept constant by means of an overflow device.

As compared with most of the methods hitherto known, the method hereinbefore described has the advantage that it permits the characteristics or the constants of the gas mixture to be tested (absorption, combustion) to be determined without any preliminary alteration being required. Therefore, also such gases can be tested which do not contain a constituent which varies easily, either chemically or physically and the variation of which it has been customary to determine in previous gas determining methods.

Moreover, the method according to the present invention permits a continuous indication, in contradistinction to the usual apparatus, and also very rapid indication, as the consumption may be of any desired value, in contradistinction to methods in which absorption is employed. The latter necessitates a comparatively small consumption, in order not to be compelled to renew too often the means of absorption.

I claim:

1. The herein described method of testing gas mixtures, which consists in causing by means of a pressure difference a flow of the gas to be tested through a conduit comprising in succession a portion mechanically reacting upon the gas by reason of its viscosity, and a portion, mechanically reacting upon the gas by means of its specific gravity, and measuring the pressure of the gas between said portions.

2. The herein described method of testing gas mixtures, which consists in causing by means of a pressure difference a flow of the gas to be tested through a set of a capillary tube and a nozzle arranged in series, and measuring the pressure of the gas between said nozzle and capillary tube.

3. The herein described method of testing gas mixtures, which consists in causing by means of a pressure difference a flow of the gas to be tested through a main conduit comprising in succession a portion mechanically reacting upon the gas by reason of its viscosity, and a portion, mechanically reacting upon the gas by means of its specific gravity, causing a flow of a compensating gas of constant chemical and physical state to the inlet end of said main conduit and through a compensating conduit comprising in succession two resistances, and measuring a value which is a resultant of the pressures respectively between said portions and between said resistances.

4. The herein described method of testing gas mixtures, which consists in causing by means of a pressure difference a flow of the gas to be tested through a set of a capillary tube and a nozzle arranged in series, causing a flow of a gas of constant chemical and physical state to the gas to be tested through a pair of successive additional capillary tubes, and measuring a value which is a resultant of the pressures respectively between said capillary tube and nozzle and said additional capillary tubes.

5. The herein described method of testing gas mixtures, which consists in causing by means of a pressure difference a flow of the gas to be tested through a main conduit comprising in succession a portion mechanically reacting upon the gas by reason of its viscosity, and a portion, mechanically reacting upon the gas by means of its specific gravity, causing a flow of a gas of a temperature equal to that of the gas to be tested through a compensating conduit comprising in succession a portion and measuring a value which is a resultant of the pressures of the gases between said portions in each of said conduits.

6. The herein described method of testing gas mixtures which consists in causing by means of a pressure difference a flow of the gas to be tested through a set of a capillary tube and a nozzle arranged in series, causing a flow of a gas of a temperature equal to that of the gas to be tested through a subsidiary set of a capillary tube and a nozzle, and measuring a value which is a resultant of the pressures of the gases between each of said nozzles and capillary tubes.

7. The herein described method of testing gas mixtures which consists in causing by means of a pressure difference a flow of the gas to be tested through a set of a capillary tube and a nozzle arranged in series, causing a flow of a gas of a temperature equal to that of the gas to be tested through a subsidiary set of a capillary tube and a nozzle, causing a flow of a gas of constant physical and chemical state to the gas to be tested through a pair of successive additional capillary tubes, and measuring a value which is a resultant of the pressures of the said gases between each of said sets of capillary tubes and nozzles and said pair of capillary tubes.

8. The method of testing gases which consists in submitting the gas at different stages to reactions operating upon the gas by its viscosity and by its specific gravity respectively, and determining the change produced in the gas between the said stages.

9. The method of testing and treating gases which consists in submitting said gas to capillary action, and to a sudden drop of pressure in different stages, and determining the change produced between said stages.

10. The method of testing gases which consists in first submitting said gas to frictional resistance, and at a distance from said resistance to a drop of pressure, and determining the change produced in the interval between the two treatments.

11. The method of testing and treating gases which consists in submitting said gases to a frictional stage, and to an efflux stage, and determining the change produced between the two stages 12. The method of testing and of treating gases which consists in submitting said gases to a frictional stage and to an efflux stage, submitting another gas of unchangeable composition and pressure to different stages of frictional resistance, determining the change produced in said second gas between said resistances, causing said second gas to unite with the first mentioned gas before the treating stages of the first mentioned gas, and determining the change produced in the first mentioned gas between the treating stages.

13. The method of testing and of treating gases which consists in submitting said gas to a frictional stage and to an efflux stage, submitting another gas of substantially unchangeable composition and pressure to a frictional stage and to an efflux stage, measuring the change produced in each of said gases between the different stages, and causing the gases to unite after the efflux stage.

14. The method of testing and treating gases which consists in submitting the gases to a frictional stage and to an efflux stage in succession, submitting another gas of substantially unvarying pressure and composition to a frictional stage and to an efflux stage, determining the change produced in each of said gases between the succeeding stages, and causing said gases to unite after the efflux stages, submitting an additional supply of a gas of substantially unvarying pressure and composition to frictional resistance in different stages, measuring the change produced in said last mentioned supply of gas between said frictional stages, and causing said last mentioned gas after said frictional stages to become united with the gas to be tested previous to its passing through the frictional and the efflux stages.

15. A system of testing and treating gases which consists of capillary means and of efflux means at a distance from each other, a pressure manometer between said stages, and an axially displaceable indicator connected to said manometer, additional capillary means and efflux means in spaced relation to each other, and connected to temperature equalizing means, tubular connecting means between the two efflux means, pressure manometers intermediate each of the efflux and capillary means, an additional gas conduit connected to the free end of the capillary means first mentioned, capillary means at a distance from each other in said last mentioned gas conduit, and a gas pressure manometer intermediate the capillary means last mentioned, and means to prevent the axial displacement of said indicator by changes of pressure and of temperature.

16. A system for testing gas mixtures, comprising a conduit having in succession a portion mechanically reacting upon the gas by reason of its viscosity, and a portion, mechanically reacting upon the gas by means of its specific gravity, means to cause a flow of the gas to be tested successively through said portions, and means to measure the pressure of the gas between said portions.

17. A system for testing gas mixtures, comprising a set of a capillary tube and a nozzle, means to cause a flow of the gas to be tested successively through said capillary tube and nozzle, and means to measure the pressure between said capillary tube and nozzle.

18. A system for testing gas mixtures, comprising a main conduit having in succession a portion mechanically reacting upon the gas by reason of its viscosity, and a portion, mechanically reacting upon the gas by means of its specific gravity, means to cause a flow of the gas to be tested successively through said portions, a compensating conduit communicating at one end with the inlet end of said main conduit and having at its opposite end an admission of a gas of constant pressure and comprising a pair of resistances, and means to measure a value which is a resultant of the pressures of the gases respectively between said portions and resistances.

19. A system for testing gas mixtures, comprising a set of a capillary tube and a nozzle, means to cause a flow of the gas to be tested successively through said capillary tube and nozzle, a conduit communicating at one end with the inlet end of said capillary tube and having at its opposite end an inlet for a gas of constant pressure and comprising a pair of resistances intermediate its ends, and means to measure a value which is a resultant of the pressures of the gases respectively between said capillary tube and nozzle and between said resistances.

20. A system for testing gas mixtures, comprising two sets each consisting of a portion mechanically reacting upon the gas by reason of its viscosity, and a portion, mechanically reacting upon the gas by means of its specific gravity, disposed in series, means to cause a flow of the gas to be tested through one of said sets and to cause a flow of a subsidiary gas of constant chemical composition through the other set, means to equalize the temperatures of said gases supplied to said sets, and means to measure a value which is a resultant of the pressures of said gases between the portions of each of said sets.

21. A system for testing gas mixtures, comprising two sets each consisting of a capillary tube and a nozzle disposed in series, means to cause a flow of the gas to be tested through the capillary tube and nozzle of one of said sets and to cause a flow of a subsidiary gas of constant chemical composition through the capillary tube and nozzle of the other set, means to equalize the temperatures of said gases supplied to said sets, and means to meausre a value which is a resultant of the pressures of said gases respectively between the capillary tube and nozzle of said sets.

22. A system for testing gas mixtures, comprising a main conduit having in succession a portion mechanically reacting upon the gas by reason of its viscosity, and a portion, mechanically reacting upon the gas by means of its specific gravity, means to cause a flow of the gas to be tested successively through said portions, a compensating passage communicating at one end with the inlet end of said conduit and having at its opposite end an inlet for a gas of constant pressure and comprising a pair of resistances, two manometers one acted upon by the pressure of the gas between said portions and the other one acted upon by the pressure between said resistances intermediate its ends, and indicating means under combined control by said manometers.

23. A system for testing gas mixtures, comprising a main conduit comprising a portion adapted to respond to differences in the tenacity of gases and a portion responding to differences in the specific weight of gases, means to cause a flow of the gas to be tested successively through said portions, a temperature compensating conduit comprising a portion adapted to respond to differences in the tenacity of gases and a portion responding to differences in the specific weight of gases, means to cause a flow of a gas of constant chemical state successively through said portions of the temperature compensating conduit, means to equalize the temperatures of the gases supplied to said conduits, a pressure compensating conduit connected at one end with the inlet end of said main conduit and having at its other end an inlet for a gas under constant pressure and comprising two resistances in series intermediate its ends, a liquid manometer connected with said main conduit between the portions thereof, a compensating liquid manometer connected with said compensating conduit between the portions thereof and having a float provided with a pressure chamber constructed to vary the buoyancy of said float, a tubular connection between said pressure chamber and the pressure compensating conduit, and indicating means under conjoint control by said manometers.

OTTO DOMMER. [L. S.]

In the presence of—
MAURICE W. ALTOFFER,
F. H. REDIKER.